US012469417B2

(12) United States Patent
Xiao

(10) Patent No.: US 12,469,417 B2
(45) Date of Patent: Nov. 11, 2025

(54) DISPLAY PANEL

(71) Applicant: Shenzhen China Star Optoelectronics Semiconductor Display Technology Co., Ltd., Guangdong (CN)

(72) Inventor: Pian Xiao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/400,376

(22) Filed: Dec. 29, 2023

(65) Prior Publication Data

US 2024/0355251 A1 Oct. 24, 2024

(30) Foreign Application Priority Data

Apr. 20, 2023 (CN) ........................ 202310471880.X

(51) Int. Cl.
*G09G 3/20* (2006.01)

(52) U.S. Cl.
CPC ....... *G09G 3/20* (2013.01); *G09G 2300/0852* (2013.01)

(58) Field of Classification Search
CPC ......................... G09G 3/20; G09G 2300/0852
See application file for complete search history.

(56) References Cited

U.S. PATENT DOCUMENTS

| | | | | |
|---|---|---|---|---|
| 11,100,849 | B1 * | 8/2021 | Yang | G09G 3/32 |
| 12,100,328 | B2 * | 9/2024 | Zhai | G09G 3/20 |
| 2008/0088547 | A1 * | 4/2008 | Chan | G09G 3/3233<br>345/76 |
| 2009/0160826 | A1 * | 6/2009 | Miller | H04N 13/398<br>345/204 |
| 2015/0035448 | A1 * | 2/2015 | Wang | G09G 3/3291<br>315/240 |
| 2019/0006448 | A1 * | 1/2019 | Zhou | H01L 27/1225 |
| 2019/0051249 | A1 * | 2/2019 | Nie | H10K 59/131 |
| 2022/0343870 | A1 * | 10/2022 | Wang | H01L 27/1255 |
| 2024/0212568 | A1 * | 6/2024 | Yang | G09G 3/2096 |

* cited by examiner

*Primary Examiner* — Ariel A Balaoing

(74) *Attorney, Agent, or Firm* — PV IP PC; Wei Te Chung

(57) ABSTRACT

A display panel includes a driving circuit for outputting a driving signal, a switching circuit coupled to the driving circuit for inputting and storing the driving signal; reading and outputting the stored driving signal; a pixel circuit connected with the switching circuit for inputting the stored driving signal. The present disclosure can improve the display effect and is conducive to the development of large-size high-resolution display panels.

16 Claims, 4 Drawing Sheets

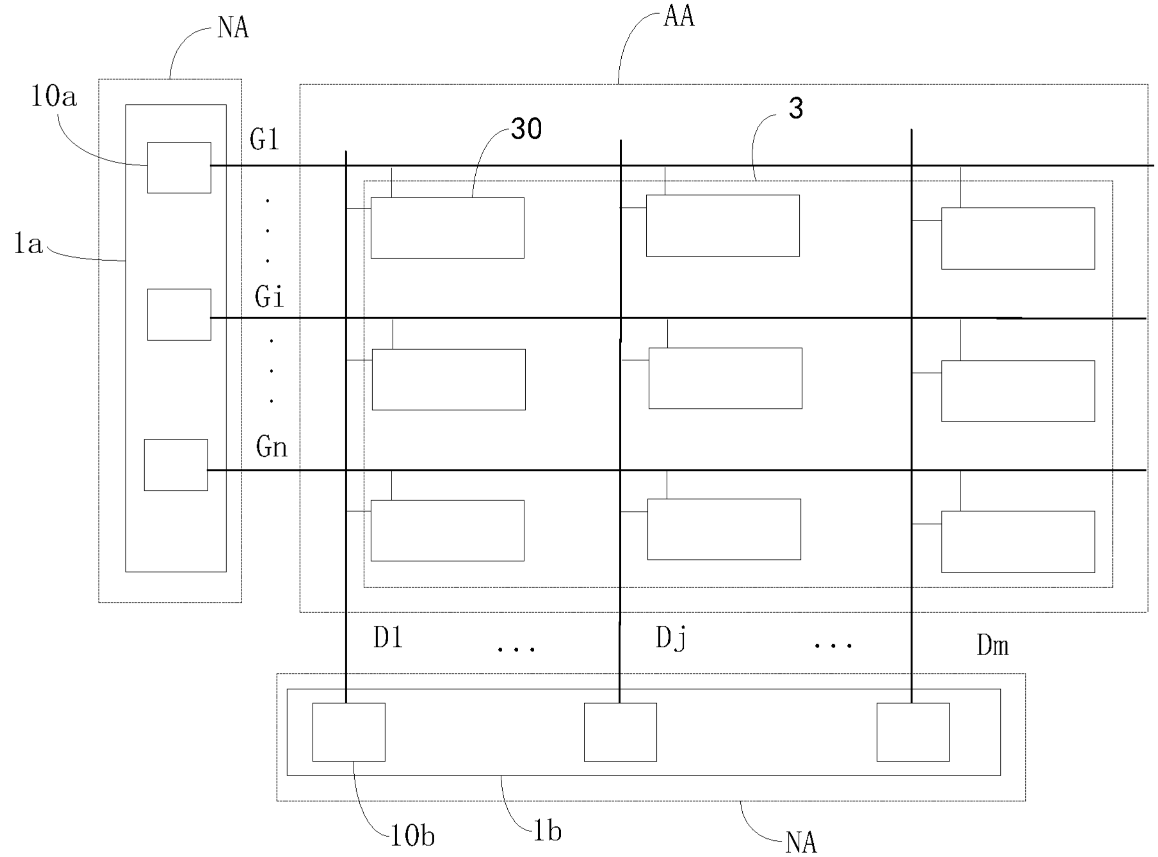
FIG. 2 (Priort art)
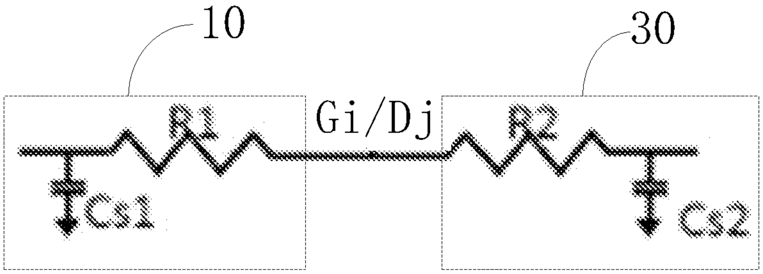
FIG. 3 (Priort art)

DISPLAY PANEL

CROSS REFERENCE TO RELATED APPLICATION

This application claims the priority of Chinese Patent Application No. 202310471880.X, entitled "Display Panel", filed on Apr. 20, 2023, the disclosure of which is incorporated herein by reference in its entirety.

FIELD OF THE DISCLOSURE

The present disclosure relates to the field of display technology, specifically relates to a light-emitting circuit and a display panel.

BACKGROUND

With the increase of the size and resolution of the display panel, the interaction between the driving circuit and the pixel circuit in the display panel will also increase, which is easy to cause serious distortion of the driving signal (scanning signal or data signal) input to the display area, thereby affecting the display effect of the display panel. It is not conducive to the development of large-size and high-resolution display panel.

SUMMARY

Embodiments of the present disclosure are directed to a display panel, which can improve the display effect and is conducive to the development of a large-size high-resolution display panel.

According to a first aspect of the present disclosure, a display panel includes a driving circuit for outputting a driving signal, a switching circuit coupled to the driving circuit, and a pixel circuit coupled to the switching circuit. The switching circuit is used for inputting and storing the driving signal, and for reading and outputting a stored driving signal. The pixel circuit is used for inputting the stored driving signal.

Optionally, the switching circuit comprises a storage capacitor, and the switching circuit is configured for inputting and storing the driving signal in the storage capacitor, and for reading and outputting the driving signal stored in the storage capacitor.

Optionally, the switching circuit further comprises a first switch transistor and a second switch transistor. The switching circuit is configured for inputting and storing the driving signal in the storage capacitor when the first switch transistor turns on and the second switch transistor turns off. The switching circuit is configured for reading and outputting the driving signal in the storage capacitor when first switch transistor turns off and the second switch transistor turns on.

Optionally, a control terminal of the first switch transistor is connected to the first switch signal, an input terminal of the first switch transistor is connected to the driving circuit, and an output terminal of the first switch transistor is connected to an input terminal of the second switch transistor. A control terminal of the second switch transistor is fed with the second switch signal, and an output terminal of the second switch transistor is connected to the pixel circuit. One end of the storage capacitor is connected to the output terminal of the first switch transistor, and the other end of the storage capacitor is grounded.

Optionally, the first switch transistor and the second switch transistor are both high-mobility transistors.

Optionally, the driving circuit comprises a first capacitor grounded, and a first resistor coupled between the switching circuit and the first capacitor.

Optionally, the pixel circuit comprises a second capacitor grounded, and a second resistor coupled between the switching circuit and the second capacitor.

Optionally, the driving circuit comprises a gate driving circuit, and the driving signal comprises a scanning signal.

Optionally, the driving circuit comprises a source driving circuit, and the driving signal comprises a data signal.

Optionally, the display panel further includes a plurality of driving circuits, a plurality of switching circuits, and a plurality of pixel circuits arranged in rows or in columns. Each of the plurality of switching circuits is connected to one of the plurality of switching circuits. Each of the plurality of pixel circuits connected to one of the plurality of switching circuits.

According to a second aspect of the present disclosure, a display panel includes a gate driving circuit for outputting a scanning signal, a first switching circuit for storing the scanning signal and outputting a stored scanning signal, a source driving circuit for outputting a data signal, a second switching circuit for storing the data signal and outputting a stored data signal, and a pixel circuit. The first switching circuit includes a first switch transistor, a first storage capacitor, and a second switch transistor. The first switch transistor includes a control terminal fed with a first switch signal, an input terminal connected to the gate driving circuit, and an output terminal connected to a first node. The first storage capacitor is coupled to the first node. The second switch transistor includes a control terminal fed with a second switch signal, an input terminal connected to the first node, and an output terminal outputting the stored scanning signal. The second switching circuit includes a third switch transistor, a second storage capacitor, and a fourth switch transistor. The third switch transistor includes a control terminal fed with the first switch signal, an input terminal connected to the source driving circuit, and an output terminal connected to a second node. The second storage capacitor is coupled to the second node. The fourth switch transistor includes a control terminal fed with the second switch signal, an input terminal connected to the second node, and an output terminal outputting the stored data signal. The pixel circuit, coupled to the first switching circuit and the second switching circuit, is used for inputting the stored scanning signal and the stored data signal.

Optionally, the first switching circuit is configured for inputting and storing the scanning signal in the first storage capacitor when the first switch transistor turns on and the second switch transistor turns off. The first switching circuit is configured for reading and outputting the scanning signal in the first storage capacitor when first switch transistor turns off and the second switch transistor turns on.

Optionally, the third switching circuit is configured for inputting and storing the data signal in the second storage capacitor when the third switch transistor turns on and the fourth switch transistor turns off. The third switching circuit is configured for reading and outputting the data signal in the second storage capacitor when third switch transistor turns off and the fourth switch transistor turns on.

Optionally, the first switch transistor, the second switch transistor, the third switch transistor, the fourth switch transistor are both high-mobility transistors.

Optionally, the gate driving circuit comprises a first capacitor grounded, and a first resistor coupled to the first capacitor, for outputting the scanning signal.

Optionally, the source driving circuit comprises a first capacitor grounded, and a first resistor, coupled to the first capacitor for outputting the data signal.

Optionally, the pixel circuit comprises a second capacitor grounded and a second resistor coupled between the switching circuit and the second capacitor.

The advantageous effect of the present disclosure is that by using a switching circuit capable of storing the driving signal output and reading the stored driving signal and outputting it to the pixel circuit, the present disclosure reduces the interference of the driving signal caused by the driving circuit and the pixel circuit, improving the display effect, and is conducive to the development of large-size high-resolution display panel.

BRIEF DESCRIPTION OF THE DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

FIG. 2 illustrates a schematic diagram of a conventional display panel.

FIG. 3 illustrates a circuit diagram of a conventional display panel.

DETAILED DESCRIPTION OF PREFERRED EMBODIMENTS

Figure 1:
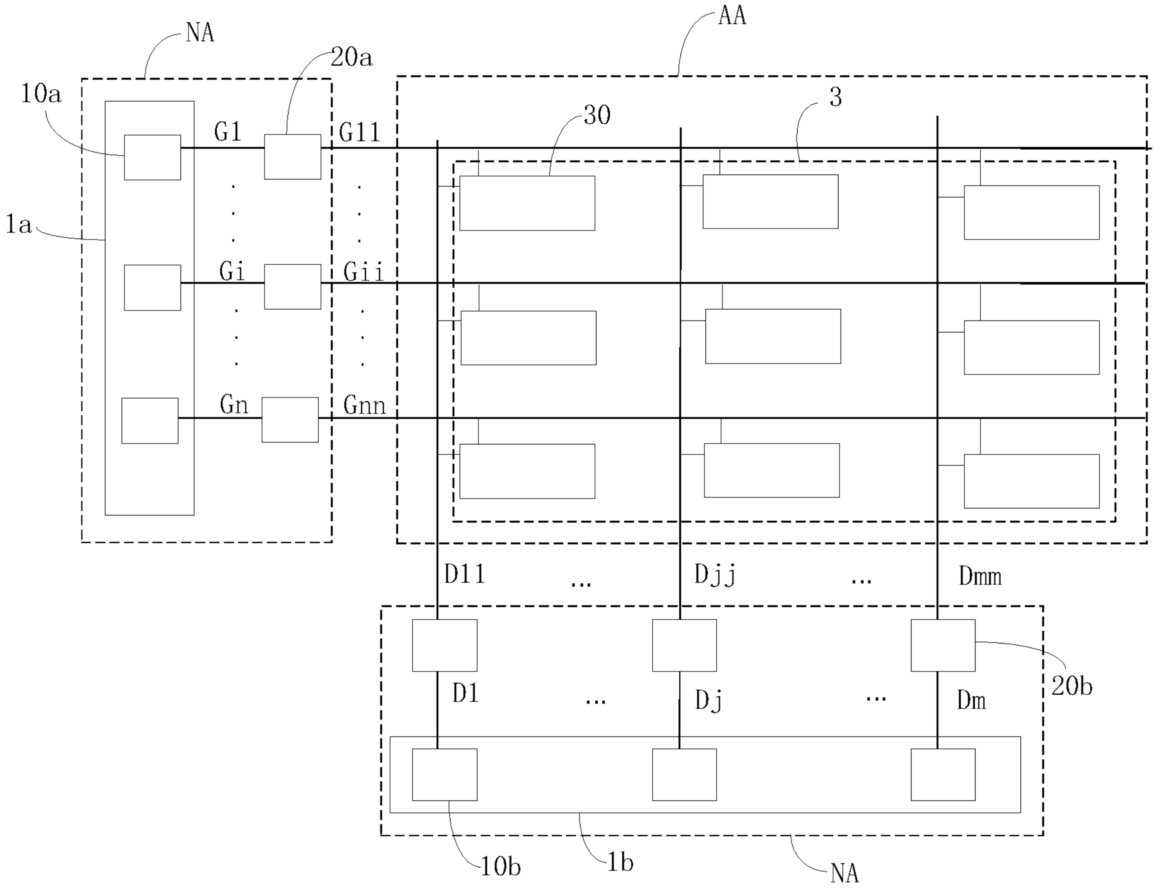
FIG. 1 illustrates a schematic diagram of the display panel according to an embodiment of the present disclosure.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

In the disclosure, it is should be understood that spatially relative terms, such as “center”, “longitudinal”, “lateral”, “length”, “width”, “above”, “below”, “front”, “back”, “left”, “right”, “horizontal”, “vertical”, “top”, “bottom”, “inner”, “outer”, “clockwise”, “counterclockwise”, “axial”, “radial”, “circumferential”, and the like, may be used herein for ease of description to describe one element or feature’s relationship to another element(s) or feature(s) as illustrated in the FIGS. It will be understood that the spatially relative terms are intended to encompass different orientations of the device in use or operation in addition to the orientation depicted in the FIGS. The spatially relative terms are not limited to specific orientations depicted in the FIGS. In addition, the term “first”, “second” are for illustrative purposes only and are not to be construed as indicating or imposing a relative importance or implicitly indicating the number of technical features indicated. Thus, a feature that limited by “first”, “second” may expressly or implicitly include at least one of the features. In the description of the present disclosure, the meaning of “plural” is two or more, unless otherwise specifically defined.

All of the terminologies containing one or more technical or scientific terminologies have the same meanings that persons skilled in the art understand ordinarily unless they are not defined otherwise. For example, “arrange,” “couple,” and “connect,” should be understood generally in the embodiments of the present disclosure. For example, “firmly connect,” “detachably connect,” and “integrally connect” are all possible. It is also possible that “mechanically connect,” “electrically connect,” and “mutually communicate” are used. It is also possible that “directly couple,” “indirectly couple via a medium,” and “two components mutually interact” are used.

In the description of this specification, the description of the terms “one embodiment”, “some embodiments”, “examples”, “specific examples”, or “some examples”, and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

The terminology used here is only for the purpose of describing specific embodiments and is not intended to limit exemplary embodiments. Unless the context expressly indicates otherwise, the singular forms “one” and “one” used here are also intended to include the plural. It should also be understood that the terms “including” and/or “containing” used here specify the existence of the stated features, integers, steps, operations, elements and/or components, without excluding the presence or addition of one or more other features, integers, steps, operations, elements, components and/or combinations thereof.

The present disclosure is further described below in conjunction with the accompanying drawings and embodiments.

Referring to FIG. 1, is a schematic diagram of a display panel according to an embodiment of the present disclosure.

As illustrated in FIG. 1, a display panel includes a display area AA and a non-display area NA located outside the display area AA. The display panel includes a gate driving module (GOA) 1*a*, a source driving module 1*b*, and a pixel module 3. The gate driving module 1*a* and the source driving module 1*b* are located in the non-display area NA, and the pixel module 3 is located in the display area AA. The gate driving module 1*a* comprises at least one gate driving circuit 10*a*, the source driving module 1*b* comprises at least one source driving circuit 10*b*, and the pixel module 3 comprises at least one pixel circuit 30. In a case that the pixel module 3 comprises a pixel circuit 30, the pixel circuit 30 connects to a row and a column of pixels. In another case that the pixel module 3 comprises a plurality of pixel circuits 30, the plurality of pixel circuits 30 connects to a row and multiple columns of pixels, or connects to a column and multiple rows of pixels, or connects to multiple rows and columns of pixels.

The number of gate driving circuits 10*a* is the same as the number of rows of pixel circuit 30, and the number of source driving circuits 10*b* is the same as the number of columns of pixel circuit 30. For example, the gate driving module 1*a* comprises n gate driving circuits 10*a*, the source driving module 1*b* comprises m source driving circuits 10*b*, and the pixel module 3 comprises n*m pixel circuits 30 for n rows and m columns, where n≥1, m≥1. The n gate driving circuits 10A and n row pixel circuits 30 are set up one by one, and m source driving circuits 10B and m row pixel circuits 30 are set one by one.

The display panel further comprises at least one scan line, and the number of scan lines is the same as the number of gate driving circuit 10*a*. That is, the number of scan lines is the same as the number of rows of pixel circuit 30. For example, the display panel also includes n scan lines. The n scan lines, n gate driving circuits 10*a, n* row pixel circuits 30 one-to-one corresponding settings. The display panel further comprises at least one data line, and the number of data lines is the same as the number of source driving circuits 10*b*. That is, the number of data lines is the same as the number of columns of pixel circuit 30. For example, the display panel also comprises m data lines. The m data lines, m source driving circuit 10*b, m* column pixel circuit 30 one-to-one corresponding settings.

The display panel also comprises a driving module which comprises a gate driving module 1*a* and/or a source driving module 1*b*. The driving module comprises at least one driving circuit that comprises a gate driving circuit 10*a* and/or a source driving circuit 10*b*. The driving circuit is used for outputting the driving signal. In a case that the driving circuit is the gate driving circuit 10*a*, the driving signal is a scanning signal Gi. In a case that the driving circuit comprises a source driving circuit 10*b*, the driving signal is a data signal Dj.

In the prior art, as illustrated in FIG. 2, the driving circuit is directly connected with the pixel circuit 30. For example, n scan lines are directly connected between the gate driving module 1*a* and the pixel module 3. That is, each gate driving circuit 10*a* is connected with a row of pixel circuits 30 through a scan line. Each gate driving circuit 10*a* is used for inputting the scanning signal Gi to the corresponding row of pixel circuits 30 through the corresponding scan line where 1≤i≤n. The m data lines are directly connected between the source driving module 1*b* and the pixel module 3. That is, each source driving circuit 10*b* is connected with a column of pixel circuits 30 through a data line. Each source driving circuit 10*b* is used for input data signal Dj to a corresponding column of pixel circuits 30 through corresponding data lines where 1≤j≤m.

As illustrated in FIG. 3, the driving circuit 10 (gate driving circuit 10*a* or source driving circuit 10*b*) comprises an RC circuit, that is, the driving circuit 10 comprises a first resistor R1 and a first capacitor Cs1. The pixel circuit 30 comprises an RC circuit, that is, the pixel circuit 30 comprises a second resistor R2 and a second capacitor Cs2. The first resistor R1 in the driving circuit 10 is directly connected with the second resistor R2 in the pixel circuit 30. That is, the RC circuit in the driving circuit 10 is directly connected with the RC circuit in the pixel circuit 30, so that the driving signal (scanning signal Gi or data signal Dj) output by the driving circuit 10 is directly input to the pixel circuit 30.

Figure 4:
FIG. 4 (Prior art)
FIG. 4 illustrates waveforms of the conventional display panel.

The RC circuit in the driving circuit 10 and the RC circuit in the pixel circuit 30 affects the driving signal (scanning signal Gi/data signal Dj), and makes the driving signal Gi/Dj seriously distorted. As shown in FIG. 4, the interaction between the RC circuit in the gate driving circuit 10*a* and the RC circuit in the pixel circuit 30 will affect the scanning signal Gi, so that the scanning signal Gi is seriously distorted, and the interaction between the RC circuit in the source driving circuit 10*b* and the RC circuit in the pixel circuit 30 will affect the data signal Dj, so that the data signal Dj is seriously distorted. Moreover, for the large size and high resolution of the display panel, the RC circuit in the driving circuit 10 and the RC circuit in the pixel circuit 30 will make great influence on the driving signal (scanning signal Gi/data signal Dj), thereby affecting the display effect of the display panel, and is not conducive to the development of large-size and high-resolution display panel.

Therefore, the present embodiment provides the switching circuits 20*a*, 20*b* connected between the driving circuit 10 and the pixel circuit 30. The driving circuit 10 connects the pixel circuit 30 through the switching circuits 20*a*, 20*b*. As shown in FIG. 1. Multiple driving circuits 10 and multiple switching circuits 20*a*, 20*b* are provided, and the number of driving circuits 10 and the number of switching circuits 20*a*, 20*b* can be the same, so that a plurality of driving circuits 10 and the plurality of switching circuits 20*a*, 20*b* are connected one-to-one.

The driving circuit 10 may comprise a gate driving circuit 10*a*. A switching circuit 20*a* is added between the gate driving circuit 10*a* and the corresponding row of pixel circuits 30. The scanning line between the gate driving circuit 10*a* and the corresponding row of pixel circuits 30 may comprise a first scanning line and a second scanning line. The gate driving circuit 10*a* connects the switching circuit 20*a* through the first scanning line, and the switching circuit 20*a* connects the corresponding row of pixel circuits 30 through the second scanning line, so that the switching circuit 20 is connected between the gate driving circuit 10*a* and the corresponding row of pixel circuits 30. Multiple switching circuits 20*a* and multiple rows of pixel circuits 30 are provided. The number of switching circuits 20*a* is the same as the number of rows of pixel circuits 30, so that the multiple switching circuits 20*a* and multiple pixel circuits 30 are connected one-to-one.

The driving circuit 10 may also comprise a source driving circuit 10*b*. The switching circuit 20*b* is added between the source driving circuit 10*b* and a corresponding column of pixel circuits 30. The data lines between the source driving circuit 10*b* and the corresponding row of pixel circuits 30 can comprise a first data line and a second data line. The source driving circuit 10*b* connects the switching circuit 20*b* through the first data line, and the switching circuit 20*b* connects the corresponding column of pixel circuits 30 through the second data line, so that the switching circuit 20*b* is connected between the source driving circuit 10*b* and the corresponding column of pixel circuits 30. Multiple switching circuits 20*b* and multiple columns of pixel circuits 30 are provided. The number of switching circuits 20*b* is the same as the number of columns of pixel circuits 30, so that multiple switching circuits 20*b* and multiple columns of pixel circuits 30 are connected one-to-one.

The driving circuit 10 is used for outputting the driving signal (scanning signal Gi or data signal Dj). The switching circuit 20*a*/20*b* which connect the driving circuit 10, are used for inputting and storing the driving signal (scanning signal Gi or data signal Dj) outputted from the driving circuit 10. The pixel circuit 30 connects the switching circuit 20*a* and 20*b* and is used for inputting the stored driving signal (scanning signal Gii or data signal Djj).

In this embodiment, because the switching circuit 20*a*, 20*b* are connected between the driving circuit 10*a*, 10*b* and the pixel circuits 30, the driving circuits 10*a*, 10*b* are not directly connected with the pixel circuit 30, and the driving signal (scanning signal Gi/data signal Dj) output by the driving circuit 10*a*, 10*b* is not directly input to the pixel circuit 30. The driving signal (scanning signal Gi/data signal Dj) output by the driving circuits 10*a*, 10*b* is first stored in switching circuits 20*a*, 20*b*. Then the driving signal (scanning signal Gii/data signal Djj) stored in switching circuit 20*a*, 20*b* is input to pixel circuit 30, preventing interaction of the driving circuit 10*a*, 10*b* and pixel circuit 30 from influencing driving signal. That is, distorted driving signal will not be applied to pixel circuit 30 to improve the display effect of display panel, which is conducive to the development of large-size and high-resolution display panel.

Figure 5A:
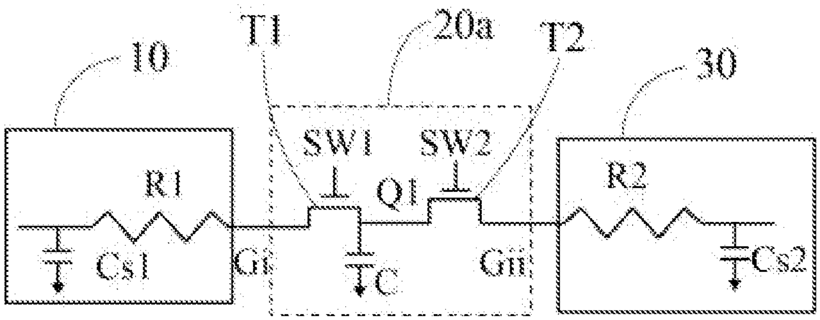
FIG. 5A and FIG. 5B illustrate circuit diagrams of the display panel according to an embodiment of the present disclosure.
Figure 5B:
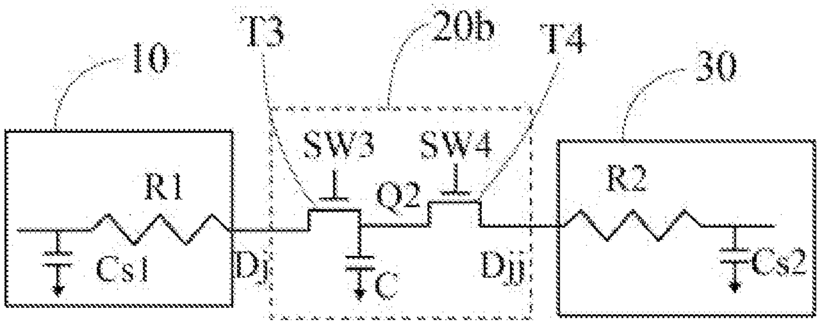

As shown in FIG. 5A and FIG. 5B, the switching circuit 20*a*, 20*b* comprises a storage capacitor C. The switching circuits 20*a*, 20*b* are used for inputting the driving signal (scanning signal Gi/data signal Dj), and the driving signal (scanning signal Gi/data signal Dj) is stored in the storage capacitor C. The switching circuits 20*a*, 20*b* are also used for reading and outputting the stored driving signal (scanning signal Gii or data Signal Djj).

The switching circuit 20*a* further comprises a first switch transistor T1 and a second switch transistor T2. The switching circuit 20*b* further comprises a third switch transistor T3 and a fourth switch transistor T4. The switching circuit 20*a*/20*b* is used for controlling the first switch transistor T1/third switch transistor T3 to turn on, and controlling the second switch transistor T2/fourth switch transistor T4 to turn off, to input the driving signal (scanning signal Gi/data signal Dj) and storing in the storage capacitor C. The switching circuit 20*a*/20*b* is used for controlling the first switch transistor T1/third switch transistor T3 to turn off, and controlling the second switch transistor T2/fourth switch transistor T4 to turn on, to read and output the stored driving signal (scanning signal Gii or data signal Djj) in the storage capacitor C.

Specifically, the control terminal of the first switch transistor T1/third switch transistor T3 is fed with the first switch signal SW1/SW3, the input terminal of the first switch transistor T1/third switch transistor T3 is connected to the driving circuit 10, the output terminal of the first switch transistor T1/third switch transistor T3 is connected to the input terminal of the second switch transistor T2/fourth switch transistor T4. The control terminal of the second switch transistor T2/fourth switch transistor T4 is fed with the second switch signal SW2/SW4, and the output terminal of the second switch transistor T2/fourth switch transistor T4 is connected to the pixel circuit 30. One end of the storage capacitor C is connected to the output terminal of the first switch transistor T1, and the other end of the storage capacitor C is grounded.

Figure 6:
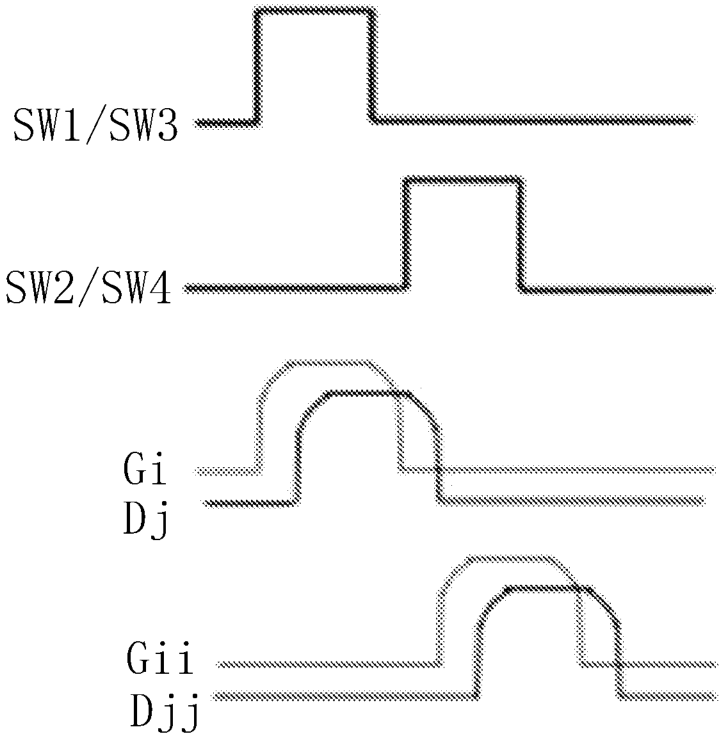
FIG. 6 illustrates waveforms of the display panel according to an embodiment of the present disclosure.

The driving signal can be divided into two phases, the write phase and the read phase. Referring to the FIG. 6, in the writing stage, the first switch signal SW1/SW3 is at high voltage level. The control terminal of the first switch transistor T1/third switch transistor T3 is fed with high voltage level of the first switch signal SW1/SW3, to turn on the first switch transistor T1/third switch transistor T3. At this moment, the second switch signal SW2/SW4 is at low voltage level, the control terminal of the second switch transistor T2/fourth switch transistor T4 is fed with the low voltage level of the second switch signal SW2/SW4 to turn off the second switch transistor T2/fourth switch transistor T4. The driving signal (scanning signal Gi/data signal Dj) output by the driving circuit 10) is written to the node Q1/Q2 and stored in the storage capacitor C. In the reading stage, the first switch signal SW1/SW3 is at low voltage level. The control terminal of the first switch transistor T1/third switch transistor T3 is fed with low voltage level of the first switch signal SW1/SW3 to turn off the first switch transistor T1/third switch transistor T3. At this moment, the second switch signal SW2/SW4 is at high level voltage. The control terminal of the second switch transistor T2/fourth switch transistor T4 is fed with high voltage level of the second switch signal SW2/SW4 to turn on the second switch transistor T2/fourth switch transistor T4. The second switch transistor T2/fourth switch transistor T4 reads the driving signal (scanning signal Gii/data signal Djj) from the node Q1/Q2 and transmits the driving signal (scanning signal Gii/data signal Djj) to the pixel circuit 30. Due to the setting of the switching circuits 20*a*, 20*b*, the driving signal (scanning signal Gi/data signal Dj) output by the driving circuit 10 is optimized, and the driving signal (scanning signal Gii/data signal Djj) input to the pixel circuit 30 is optimized.

The first switch transistor T1, second switch transistor T2, third transistor T3, and fourth transistor T4 can be transistors. The control terminals of the first switch transistor T1, second switch transistor T2, third transistor T3, and fourth transistor T4 are the gates of the transistors. The input terminals of the first switch transistor T1, second switch transistor T2, third transistor T3, and fourth transistor T4 are the drains of the transistors. The output terminals of the first switch transistor T1, second switch transistor T2, third transistor T3, and fourth transistor T4 are the sources of the transistors. Specifically, all the first switch transistor T1, second switch transistor T2, third transistor T3, and fourth transistor T4 can be high mobility transistors. The high-mobility transistor can miniaturize the first switch transistor T1, second switch transistor T2, third transistor T3, and fourth transistor T4 to improve the charging and discharging capabilities.

As shown in FIG. 5*a* and FIG. 5*b*, the driving circuit 10 comprises an RC circuit, that is, the driving circuit 10 comprises a first resistor R1 and a first capacitor Cs1. One end of the first resistance R1 is connected to the switching circuit 20, the other end of the first resistance R1 is connected to one end of the first capacitor Cs1. The other end of the first capacitor Cs1 is grounded. Specifically, when the switching circuit 20 comprises a first switch transistor T1, one end of the first resistor R1 is connected to the input terminal of the first switch transistor T1 in the switch circuit 20. Understandably, the driving circuit 10 can also include other components, which will not be repeated in detail here.

The pixel circuit 30 comprises an RC circuit, that is, the pixel circuit 30 comprises a second resistor R2 and a second capacitor Cs2. One end of the second resistance R2 is connected to the switching circuit 20, the other end of the second resistance R2 is connected to one end of the second capacitor Cs2. The other end of the second capacitor Cs2 is grounded. Specifically, when the switching circuit 20 comprises a second switch transistor T2, one end of the second resistor R2 is connected to the output terminal of the second switch transistor T2 in the switch circuit 20. Understandably, the pixel circuit 30 can also include other components, which will not be repeated in detail here.

The embodiment discloses the switching circuits 20*a*, 20*b* between the RC circuit in the driving circuit 10 and the RC circuit in the pixel circuit 30. The two RC circuits are connected through the switching circuits 20*a*, 20*b*. Because the two RC circuits are not directly connected, the interference of the driving signal outputted from the driving circuit 10 caused by interaction of the two RC circuits will not be distorted and fed to the pixel circuit 30, improving the display effect of the display panel.

To sum up, the embodiment of the present disclosure proposes a switching circuit capable of storing the driving signal output and reading the stored driving signal and outputting it to the pixel circuit, which reduces the interference of the driving signal caused by the driving circuit and the pixel circuit, improving the display effect, and is conducive to the development of large-size high-resolution display panel.

To sum up, although the present disclosure has been disclosed as above with the preferred embodiment, the above preferred embodiment is not used to limit the present disclosure, and those skilled in the art can make various changes and embellishments without departing from the spirit and scope of the present disclosure, so the scope of protection of the present disclosure is subject to the scope defined by the claims.

What is claimed is:

1. A display panel, comprising:
- a plurality of driving circuits, each of the plurality of driving circuits being configured for outputting a scanning signal and a data signal;
- a plurality of switching circuits, each of the plurality of switching circuits being connected to one of the plurality of driving circuits, and configured for inputting and storing the scanning signal and the data signal, and for reading and outputting a stored scanning signal and a stored data signal; and
- a plurality of pixel circuits arranged in rows or in columns, each of the plurality of pixel circuits arranged in rows or in columns being connected to one of the plurality of switching circuits, and configured for inputting the stored scanning signal and the stored data signal.

2. The display panel of claim 1, wherein each of the plurality of switching circuits comprises a storage capacitor, and the switching circuit is configured for inputting and storing the scanning signal and the data signal in the storage capacitor, and for reading and outputting the scanning signal and the data signal stored in the storage capacitor.

3. The display panel of claim 2, wherein each of the plurality of switching circuits further comprises:
- a first switch transistor and a second switch transistor, and the switching circuit is configured for inputting and storing the scanning signal and the data signal in the storage capacitor when the first switch transistor turns on and the second switch transistor turns off; the switching circuit is configured for reading and outputting the scanning signal and the data signal in the storage capacitor when first switch transistor turns off and the second switch transistor turns on.

4. The display panel of claim 3, wherein a control terminal of the first switch transistor is connected to the first switch signal, an input terminal of the first switch transistor is connected to the driving circuit, an output terminal of the first switch transistor is connected to an input terminal of the second switch transistor, a control terminal of the second switch transistor is fed with the second switch signal, an output terminal of the second switch transistor is connected to the pixel circuit, one end of the storage capacitor is connected to the output terminal of the first switch transistor, and the other end of the storage capacitor is grounded.

5. The display panel of claim 3, wherein the first switch transistor and the second switch transistor are both high-mobility transistors.

6. The display panel of claim 1, wherein each of the plurality of driving circuits comprises:
- a first capacitor grounded; and
- a first resistor, coupled between the switching circuit and the first capacitor.

7. The display panel of claim 1, wherein each of the plurality of pixel circuits comprises:
- a second capacitor grounded; and
- a second resistor, coupled between the switching circuit and the second capacitor.

8. The display panel of claim 1, wherein the plurality of driving circuits comprise a plurality of gate driving circuits.

9. The display panel of claim 1, wherein the plurality of driving circuits comprise a plurality of source driving circuits.

10. A display panel, comprising:
- a plurality of gate driving circuits, each of the plurality of gate driving circuits being configured for outputting a scanning signal;
- a plurality of first switching circuits, each of the plurality of first switching circuits being connected to one of the plurality of gate driving circuits, and configured for storing the scanning signal and outputting a stored scanning signal, each of the plurality of first switching circuits comprising:
- a first switch transistor, comprising a control terminal fed with a first switch signal, an input terminal connected to the gate driving circuit, and an output terminal connected to a first node;
- a first storage capacitor, coupled to the first node; and
- a second switch transistor, comprising a control terminal fed with a second switch signal, an input terminal connected to the first node, and an output terminal outputting the stored scanning signal;
- a plurality of source driving circuits, each of the plurality of source driving circuits being configured for outputting a data signal;
- a plurality of second switching circuits, each of the plurality of second switching circuits being connected to one of the plurality of source driving circuits, and configured for storing the data signal and outputting a stored data signal, each of the plurality of second switching circuits comprising:
- a third switch transistor, comprising a control terminal fed with a third switch signal, an input terminal connected to the source driving circuit, and an output terminal connected to a second node;
- a second storage capacitor, coupled to the second node; and
- a fourth switch transistor, comprising a control terminal fed with a fourth switch signal, an input terminal connected to the second node, and an output terminal outputting the stored data signal;
- a plurality of pixel circuits arranged in rows, each of the plurality of pixel circuits in rows being connected to one of the plurality of first switching circuits, and configured for inputting the stored scanning signal; and
- a plurality of pixel circuits arranged in columns, each of the plurality of pixel circuits in columns being connected to one of the plurality of second switching circuits, and configured for inputting the stored data signal.

11. The display panel of claim 10, wherein each of the first switching circuits is configured for inputting and storing the scanning signal in the first storage capacitor when the first switch transistor turns on and the second switch transistor turns off; each of the first switching circuits is configured for reading and outputting the scanning signal in the first storage capacitor when first switch transistor turns off and the second switch transistor turns on.

12. The display panel of claim 10, wherein each of the second switching circuits is configured for inputting and storing the data signal in the second storage capacitor when the third switch transistor turns on and the fourth switch transistor turns off; each of the second switching circuit is configured for reading and outputting the data signal in the second storage capacitor when third switch transistor turns off and the fourth switch transistor turns on.

13. The display panel of claim 10, wherein the first switch transistor, the second switch transistor, the third switch transistor, the fourth switch transistor are both high-mobility transistors.

14. The display panel of claim 10, wherein each of the plurality of gate driving circuits comprises:

a first capacitor grounded; and a first resistor, coupled to the first capacitor, for outputting the scanning signal.

15. The display panel of claim 10, wherein each of the plurality of source driving circuits comprises:

a first capacitor grounded; and a first resistor, coupled to the first capacitor, for outputting the data signal.

16. The display panel of claim 10, wherein each of the plurality of pixel circuits arranged in rows or each of the plurality of pixel circuits arranged in columns comprises:

a second capacitor grounded; and a second resistor, coupled between the first switching circuit or the second switching circuit and the second capacitor.

* * * * *